Nov. 28, 1967  R. L. RISCHMAN  3,354,494
WINDOW WIPER MECHANISM
Filed June 25, 1965  3 Sheets-Sheet 1

INVENTOR.
ROBERT L. RISCHMAN
BY George A. Sullivan
Agent

Nov. 28, 1967  R. L. RISCHMAN  3,354,494
WINDOW WIPER MECHANISM

Filed June 25, 1965  3 Sheets-Sheet 2

INVENTOR.
ROBERT L. RISCHMAN
BY
*George L. Sullivan*
Agent

Nov. 28, 1967  R. L. RISCHMAN  3,354,494
WINDOW WIPER MECHANISM
Filed June 25, 1965  3 Sheets-Sheet 3

INVENTOR.
ROBERT L. RISCHMAN
BY
George Sullivan
Agent

United States Patent Office 3,354,494
Patented Nov. 28, 1967

3,354,494
WINDOW WIPER MECHANISM
Robert L. Rischman, Marietta, Ga., assignor to Lockheed Aircraft Corporation, Burbank, Calif.
Filed June 25, 1965, Ser. No. 466,992
11 Claims. (Cl. 15—250.24)

This invention relates to window wipers generally and more particularly to a window wiper mechanism including a power actuator therefor by which it is moved linearly back and forth across the window.

While the present invention has general application as a power actuated window wiper, it finds particular utility in a windshield cleaning system for aircraft. In aircraft it is not only desirable to clear as large an area of the windshield as possible, but also due to the speed and operating conditions peculiar to aircraft to ensure the constant contact of the wiper blade against the windshield, i.e., to prevent "lift off." At the same time such a system must be totally reliable and ready for efficient operation when needed and yet impose virtually no burden on the aircraft or its performance.

In prior designs the solution to the lift off problem has been to provide a counteracting force usually through spring pressure to overcome the aerodynamic forces that act on the blade element. Where effective, this results in undue wear on the blade and scoring of the glass surface of the windshield. Also, the added structure to ensure such pressure increases drag which interferes with the movement of the wiper when operating and with the total performance of the aircraft during normal cruise or flight. It has therefore been proposed to employ additional mechanisms to retract the wiper and associated apparatus into the aircraft when not being used. This at least eliminates objectionable drag during normal flight but introduces new problems and complexities.

In addition, in most present day aircraft it is desirable to control the temperature, pressure, etc., internally of the aircraft particularly in the cabin and passenger sections. Special precautions must therefore be taken in the mounting of the wiper and its operating mechanism.

The instant invention recognizes the above and other problems in the design, construction and operation of a reliable, efficient and relatively uncomplicated wiper system for aircraft as well as the shortcomings of existing and previously proposed solutions thereto. To this end it is herein proposed to mount the wiper blade in position adjacent the windshield for operation in a fixed plane where it is maintained by positive connection means as opposed to force applying means. This permits a clearing or cleaning of maximum windshield area without the possibility of lift off while assuring a uniform and constant blade pressure on the glass throughout its linear travel across the windshield.

The operating and drive mechanism for this wiper blade is mounted entirely within the aircraft where it not only creates no drag, but it is also completely sheltered from the elements to protect and preserve the operating components thereof. The connection of this mechanism to the wiper blade is such that the interior of the aircraft is sealed at all times against leakage therethrough.

Moreover, the wiper system contemplated herein includes means for the adjustment of the blade position relative to the windshield whereby the designed contact pressure therebetween is established and maintained throughout the life of the blade preventing its undue wear as well as marring of the windshield surface. The blade is also protected externally from the elements by means employed to render it aerodynamically clean and thereby minimize any adverse drag it might create.

The foregoing and other objects of this invention will become apparent with the description that follows and which refers specifically to a preferred embodiment of the invention illustrated by way of example in the accompanying drawings wherein.

Figure 1:
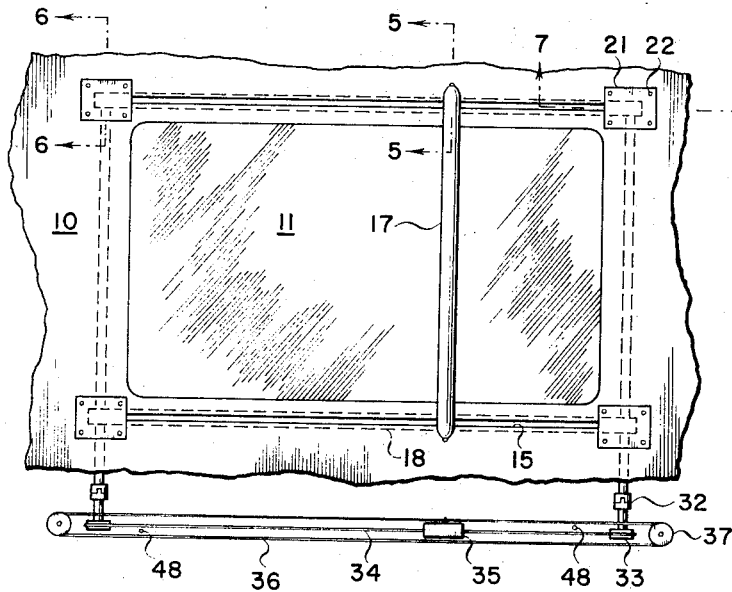
FIGURE 1 is a front elevation of a portion of an aircraft defining a windshield to show a wiper mechanism constructed in accordance with the teachings of the invention associated therewith.
Figure 5:
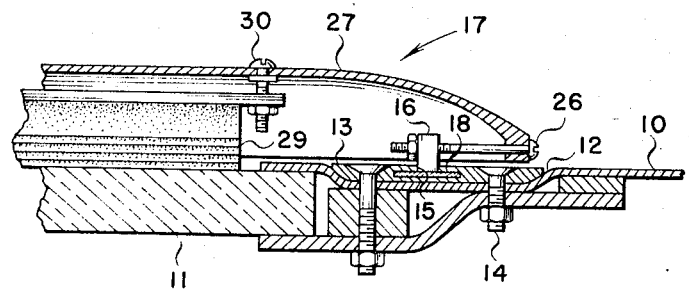
FIGURE 5 is a section taken along line 5—5 of FIGURE 1 to show the connection of the blade element at each of its ends whereby the position of its wiping edge is located in contact with the windshield and its linear movement across the window is controlled.
Figure 6:
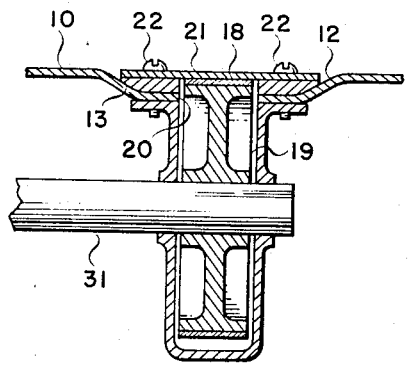
Figure 2:
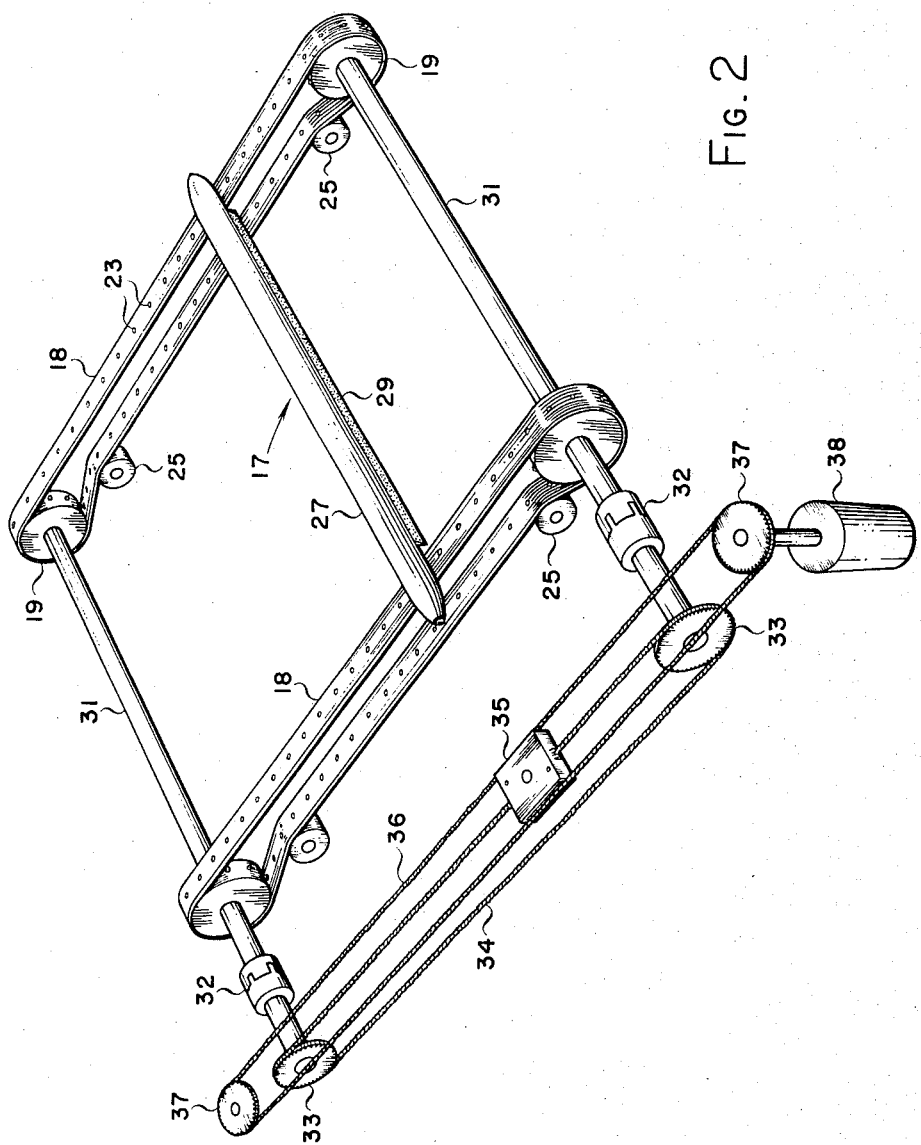
FIGURE 2 is an isometric view of the wiper mechanism shown in FIGURE 1.
Figure 3:
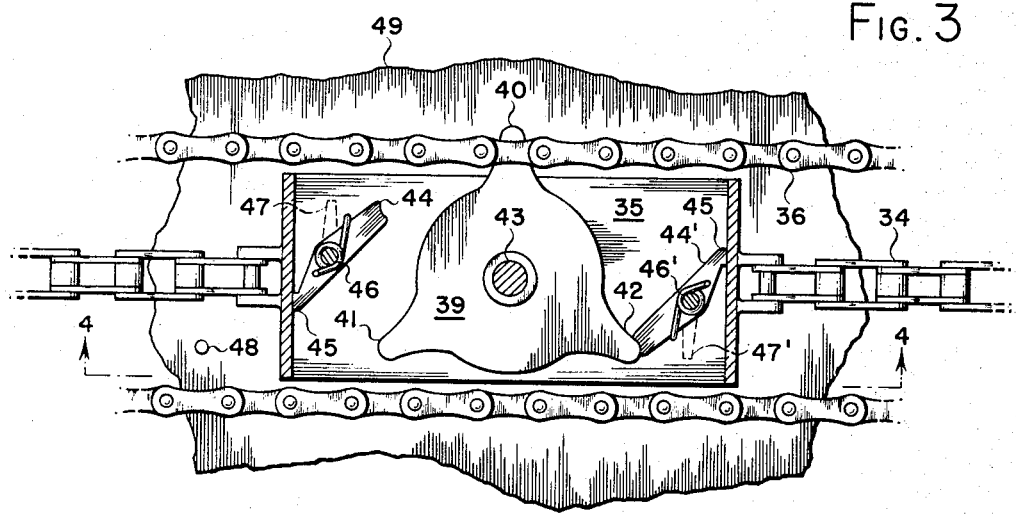
FIGURE 3 is a fragmentary view partly in section of the operating and drive mechanism for the blade element.
Figure 4:
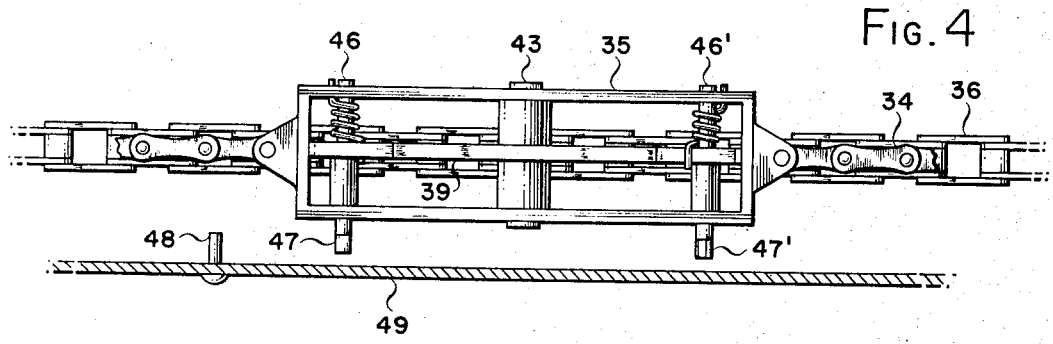
FIGURE 4 is a section taken along line 4—4 of FIGURE 3.
Figure 7:
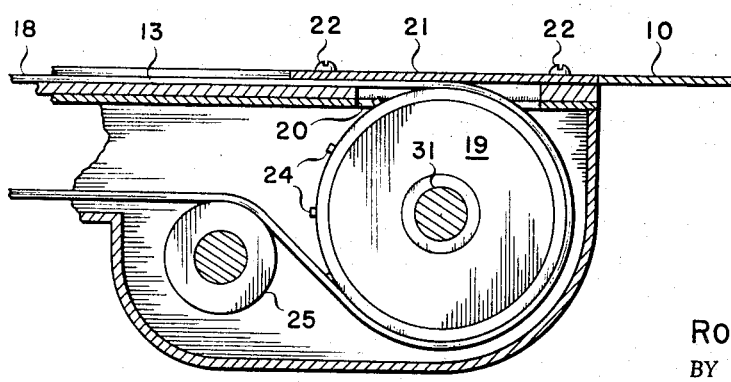

FIGURE 6 is a section taken along line 6—6 of FIGURE 1 to show the means by which the blade element on the outside of the aircraft is connected to its actuating mechanism inside the aircraft; and FIGURE 7 is a section taken along line 7—7 of FIGURE 1 to show the same means displaced 90°.

Referring more particularly to the drawings, 10 designates a portion of the aircraft defining a windshield 11 mounted therein in a conventional manner. At and along opposite sides of the window 11 the aircraft 10 is indented or grooved as at 12. Seated within and filling each groove 12 is a track 13 fabricated of wear resistant material such as nylon formed or shaped to lie flush with the external surface of the aircraft 10 and constitutes an aerodynamically clean continuation thereof. Each such track 13 is secured in its groove 12 preferably by connectors such as the bolts 14 and is slotted longitudinally as at 15 along its outer surface to accommodate a mounting block 16 to which the wiper element 17 is connected.

Underlying each slot 15 the associated track 13 is provided with a channel having transverse dimensions generally corresponding to those of a band 18 adapted to be contained and to reciprocate freely therein. Preferably each of the bands 18 is fabricated of flexible stainless steel in a continuous or endless belt the opposite ends of which pass around a sprocket drum 19 disposed adjacent each of the opposite ends of the windshield 11 and internally of the aircraft 10.

The area of the aircraft 10 within the grooves 12 adjacent each sprocket drum 19 is cut out, as at 20, to permit the passage of each drum 19 therethrough as well as the passage of the band 18 from the exterior to the interior of the aircraft 10. A cover plate 21 overlies and thereby encloses each end portion of each groove 12 where it is secured in position by connectors 22. In order to dispose the outer surface of each plate 21 flush with the adjacent surface of the aircraft 10, the thickness of each track 13 is reduced accordingly in these areas. Being disposed between the adjacent surfaces of each plate 21 and associated area of the aircraft 10, the tracks 13 serve as seals to prevent fluid leakage therethrough and maintain the interior of the aircraft airtight.

Each band 18 is pierced along its length by perforations 23 for engagement with teeth 24 projecting from the drums 19 whereby rotation of the several drums in each direction drives the bands accordingly. Adjacent each drum 19 is an idler drum 25 over which the associated band 18 is made to pass so as to locate the portions of the bands 18 between the sprocket drums 19 in close proximity to each other and thereby reduce the transverse dimension of the sprocket drum band assembly. Each idler 25 is preferably adjustable in position to permit the regulation of tension of the band 18 and maintain it taut at all times.

The wiper element 17 is connected at each end through appropriate connectors 26 to the associated mounting block 16 which in turn is immovably secured for example by welding to the associated band 18. The wiper element 17 comprises a V-shaped housing 27 which when connected as stated projects from the windshield 11 with its apex forward to constitute an aerodynamic cover for the underlying wiper blade 29. The blade 29 is of conventional design and is connected to the housing 27 by adjustable fastener means 30 whereby it projects therefrom with its wiping edge in contact with the outer surface of the windshield 11.

The fasteners 30 permit the regulation of the contacting pressure of the blade 29 against the windshield 11 and once set this pressure is maintained due to the connectors 26 at opposite ends thereof. The blade 29 may thereby be adjusted to a pressure just sufficient to deform or bend it against the windshield surface to perform the clearing operation. Upon rotation of the several drums 19 in one direction the wiper blade 29 is moved across the windshield 11, and upon rotation of the drums 19 in the opposite direction the wiper blade 29 is moved back.

In order to effect such rotation of the drums 19, each drum 19 adjacent the same side of the windshield 11 is interconnected through a shaft 31. The shafts 31 extend beyond their associated drums 19 at corresponding ends of the windshield 11 where they are removably connected to flexible, self-aligning couplings 32, respectively, which terminate in keyed connections to sprocket wheels 33. These sprocket wheels 33 are interconnected for rotation in unison through a chain 34. Connected in the length of the chain 34 is a carriage 35 with releasable and engageable elements operative to alternately connect the chain 34 to opposite sides of a drive chain 36 connecting a pair of drive sprockets 37 driven by a power unit such as an electric motor 38.

More specifically, the drive sprockets 37 are disposed at right angles to the driven sprocket wheels 33 and are substantially equal in diameter to the transverse dimension of the carriage 35 whereby the chain 36 is disposed on opposite sides thereof. The carriage 35 contains a wheel 39 having three projecting spaced teeth 40, 41 and 42 freely rotatable therein on a spindle 43. Also mounted within the carriage 35 adjacent the opposed ends thereof is a spring-loaded detent or pawl 44 and 44' each disposed with an end normally projecting into the path of rotation of the teeth 40, 41 and 42. A stop 45 formed or otherwise provided on the other end of each pawl 44 and 44' limits the rotation thereof under the normal action of its spring.

Each pawl 44 and 44' is mounted for rotation on a pivot 46 and 46' which extends beyond the outer limits of the carriage 35 and terminates in a lateral projection 47 and 47'. The pivots 46 and 46' are located out of alignment with one another relative to the line of travel of the carriage 35 as established by the chain 34 whereby the projections 47 and 47' move in unison therewith in different paths. An obstruction 48 carried by relatively fixed structure 49 adjacent each sprocket 37 projects into the path of each projection 47 and 47' and is operative to forcibly rotate the associated pawl 44 and 44' against the action of its spring out of the path of rotation of the teeth 40, 41 and 42.

In view of the foregoing construction and arrangement, when the motor 38 is operating the chain 36 is driven thereby in a counterclockwise direction. The first tooth 40 of the wheel 39 engages the chain 36 concurrently with the abutment of the third tooth 42 against the associated pawl 44' whereby the carriage 35 is connected to the chain 36 for rotation of the several drums 19 in a counterclockwise direction driving the wiper element 17 from right to left (FIGURE 1) across the windshield 11.

As the carriage 35 approaches the left side of the windshield 11, the pawl 44' in contact with the third tooth 42 is actuated against the normal action of its spring by the obstruction 48 striking the projection 47' and moved thereby to release the third tooth 42.

Continued movement of the chain 36 in the counterclockwise direction now rotates the wheel 39 and moves the first tooth 40 into engagement with the pawl 44 and concurrently connects the second tooth 41 with the chain 36 on the opposite side of the carriage 35. This results in a clockwise rotation of the several drums 19 and a movement of the wiper element 17 in the opposite direction across the wildshield 11. As the wiper element 17 thus moved approaches the right side (FIGURE 1) of the windshield 11, the projection 47 on pawl 44 strikes the other obstruction 48 disengaging it from the first tooth 40 allowing the wheel 39 to rotate until the second tooth 41 strikes the pawl 44'. At this time the third tooth 42 has rotated to a position where it connects the chain 36 on the opposite side of the carriage 35 resulting in the wiper element 17 reversing its direction, i.e., moving from right to left (FIGURE 1) over the windshield 11. This operation continues so long as the motor 38 is operating and the wiper element 17 is thereby alternately driven back and forth across the windshield 11.

The geometry of the wheel 39 including its teeth 40, 41 and 42 and the pawls 44 and 44' as well as the chain 36 is such that one of the teeth 40, 41 or 42 is always engaged with the chain 36. A positive control is thereby maintained at all times between the drive and driven elements of the mechanism. Thus, each tooth 40, 41 and 42 in succession is delivered to its receiving pawl 44 or 44' resulting in a smooth transition from one direction of motion to the other and a shockless reversal of the wiper blade traverse. The speed of the operation or traverse of the blade 29 may be varied to conform to degree of precipitation through conventional control means, such as a rheostat to vary the drive of the motor 38.

As stated above, the foregoing description is directed to a preferred embodiment of the invention as illustrated in the accompanying drawings. Various modifications of this illustrated embodiment may be made without departing from the true spirit and scope of the invention as set forth at the begining hereinabove and in the appended claims which alone constitute limitations of the invention.

What is claimed is:
1. A window wiper mechanism comprising:
   a pair of shafts, one mounted adjacent each end of a window;
   a band disposed along each side of said window substantially at right angles to said shafts and connected at each of its ends to one of said shafts;
   a wiper element secured at opposite ends to said bands;
   a blade carried by said wiper element and projecting therefrom to contact the window; and
   a drive common to both of said shafts for the rotation thereof in unison periodically in alternate directions whereby the blade is moved back and forth across the window.
2. The wiper mechanism of claim 1 wherein each of said bands is mounted in a track secured to structure defining said window, said structure being recessed and said track being contoured to conform thereto with its outer surface disposed in the plane of the surrounding window structure.
3. The wiper mechanism of claim 1 including a disconnectable coupling between said drive and shafts.
4. The wiper mechanism of claim 1 wherein said shafts and drive are mounted internally of said structure and including localized slots in said structure for the passage of each said band therethrough and a substantially airtight closure overlying and covering each of said slots.
5. The wiper mechanism of claim 1 including adjustable means operative between said element and said blade to regulate the relative position thereof whereby the contacting pressure of the blade on the window is established and maintained.

6. The wiper mechanism of claim 1 wherein each said band is an endless perforated belt and including a drum on each said shaft adjacent the ends thereof having projecting teeth adapted to engage the perforations in the associated belt and an idler drum mounted adjacent and in the plane of each shaft drum aforesaid to receive and pass the associated belt thereover and thereby reduce the space between the portions of the belt between the associated drums of each shaft.

7. The wiper mechanism of claim 1 wherein said wiper element comprises a V-shaped housing with its apex projecting forward of the window overlying and enclosing said blade, and a releasable connector securing each end of said housing to the associated band.

8. The wiper mechanism of claim 1 wherein said drive includes a chain interconnecting said shafts, a power unit, and an engagement operative to periodically connect and concurrently disconnect opposite sides of said chain to and from said unit.

9. The wiper mechanism of claim 8 including a disconnectable flexible coupling in the length of each of said shafts between the connections thereto of said bands and said chain.

10. The wiper mechanism of claim 1 wherein said drive includes a driven chain interconnecting said shafts, a carriage connected in the length of said driven chain, a drive chain straddling said carriage, and engageable and releasable elements carried by said carriage to alternately coact with the portion of said drive chain on either side thereof.

11. The wiper mechanism of claim 10 wherein said engageable and releasable elements comprise teeth projecting from the periphery of a wheel rotatably mounted on said carriage, stop means disposed in the path of rotation of said teeth and operative to secure said wheel against rotation with at least one of said teeth engaging said drive chain on one side of said carriage, and actuator means to move said stop means out of the path of rotation aforesaid periodically for the rotation of said wheel by said drive chain and to permit the return of said stop means into the path of rotation with at least one of said teeth engaging said drive chain on the other side of said carriage.

References Cited

UNITED STATES PATENTS

| 1,729,069 | 9/1929 | Tormoso | 15—250.24 |
| 1,774,356 | 8/1930 | Cloud | 15—250.24 X |

FOREIGN PATENTS

| 389,422 | 3/1933 | Great Britain. |

CHARLES A. WILLMUTH, *Primary Examiner.*